Feb. 24, 1970          C. R. CANNON          3,497,072
REVERSE OSMOSIS MEMBRANE AND METHOD OF MANUFACTURE
Filed May 2, 1966
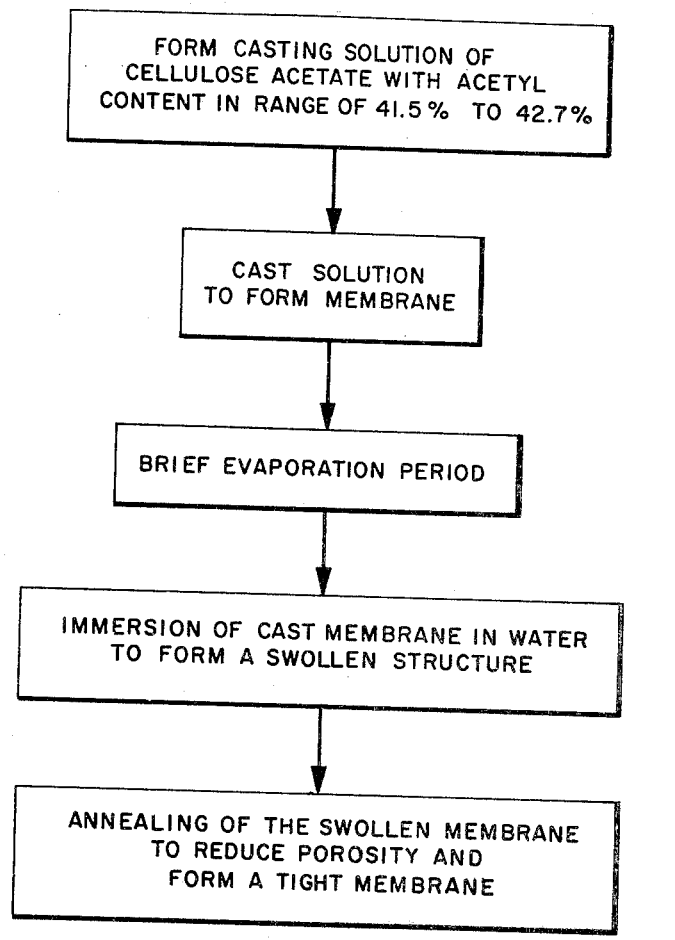
INVENTOR.
CHARLES R. CANNON
BY Edward O. Ansell
ATTORNEY : 3,497,072
Patented Feb. 24, 1970

3,497,072
REVERSE OSMOSIS MEMBRANE AND METHOD
OF MANUFACTURE
Charles R. Cannon, Baldwin Park, Calif., assignor to
Aerojet-General Corporation, El Monte, Calif., a
corporation of Ohio
Filed May 2, 1966, Ser. No. 546,591
Int. Cl. B01d 13/04
U.S. Cl. 210—500                                    9 Claims

ABSTRACT OF THE DISCLOSURE

A cellulose acetate reverse osmosis membrane characterized by high flux ability and superior salt retention properties and having an acetyl content in the range of about 41.5% to about 42.7% by weight of the cellulose acetate.

---

This invention relates generally to reverse osmosis and more particularly provides an improved reverse osmosis process, an improved reverse osmosis membrane and improvements in the casting solution and method of manufacturing of the membrane.

It is known to employ cellulose acetate membranes in a reverse osmosis technique for the desalination of water and generally for the separation of water from various aqueous solutions. In one prior art process for the preparation of the membrane, as taught in Loeb et al., U.S. Patents, 3,133,132 and 3,133,137, the cellulose acetate is dissolved in a suitable organic solvent such as acetone to form a casting solution which in addition contains water and a swelling agent for the cellulose ester. Loeb et al. disclose in their patent the use of perchlorate salts as the swelling agents. Water in the casting solution serves as a solvating agent and is believed to form with the swelling agent a molecular or ionic complex (a hydrate) which is attracted to the functional groups of the cellulose acetate, thus achieving a swelling of the cellulose. In the manufacture of the film the casting solution is dispersed in a thin film on a suitable casting surface to form a membrane, following which the solvent of the thin film is usually permitted to partially evaporate and the film is then set or gelled through a desolvation mechanism by immersion in cold water. The cast film which at this stage of manufacture has a swollen gel structure is next annealed to provide a tight membrane having the ability to pass water and restrain passage of salt. During the annealing process, a contraction of the swollen gel structure is accomplished. Prior to annealing, the swollen cellulose ester membrane possesses a primary gel structure which exhibits high water transport and low salt retention. Annealing is a syneresis phenomenon, wherein the primary gel structure is shrunk as evidenced by loss of water from the membrane. Annealing may be achieved by immersion of the swollen primary gel structure in a hot water bath. In another annealing procedure, water is extracted from the primary gel structure by a solvent treatment which comprises immersing the swollen primary gel structure in a suitable water-miscible solvent as disclosed in co-pending application of Charles R. Cannon, Paul A. Cantor and William M. King, Ser. No. 528,064, filed Feb. 17, 1966.

Other materials than Loeb's perchlorate salts may be used as swelling agents, for example, certain organic compounds as disclosed in a co-pending application of William M. King and Paul A. Cantor, Ser. No. 521,034, filed Jan. 17, 1966. Mineral acids, for example, perchloric acid and phosphoric acid are also useful as swelling agents as disclosed in co-pending application of William M. King and Paul A. Cantor, Ser. No. 538,498, filed Feb. 21, 1966. Water is the most common solvating agent; however, other materials have been suggested for this role, e.g. the lower alcohols such as methanol or ethanol. In some instances the same material may serve in more than one role, for example, a compound may be both a swelling agent and solvent for the cellulose acetate.

The mechanism involved in the formation of the desalination membrane is basically a gelation process, involving the coagulation of the cellulose acetate solution into a comparatively rigid mass which incorporates a large amount of water. It is known that semipermeable cellulose membranes suitable for reverse osmosis operations have a top or active layer and an underlying bottom or substructural layer. The active layer includes that surface of the membrane which first contacts water when the newly-cast membrane is immersed in the cold water bath in the fabrication procedure. The cellulose acetate of the active layer tends to exist as a compacted mass of polymer molecules in contrast to the open cell foam structure which predominates in the substructure layer. Electron-microscopy has shown the membrane to possess a grainy substructure and a relatively clear top layer. Desalination only occurs when the active layer or surface is in contact with the saline solution. It is believed that the thickness of the active layer is between approximately 5 and 12% of the total membrane thickness. Typically, the moisture content of the cellulose acetate membrane following annealing (syneresis) is in the range of 50 to 70% of the total of the membrane.

Workers in the area of cellulose acetate reverse osmosis membrane research have been aware that the composition of the polymer casting solutions including the particular solvent employed, the swelling agent and the solvating agent utilized along with fabrication temperature and other processing considerations surrounding fabrication have a bearing upon the water flux (the rate of water transport across the membrane) and the selectivity of the product membrane. It is possible by judicious selection of the components of the casting solution and processing conditions to improve flux and selectivity. Selectivity pertains to the semipermeable characteristic of the membrane which is the ability to restrain passage of salt.

The cellulose acetate compositions which have been used heretofore in the formation of the semipermeable reverse osmosis membranes have been formed from commercially available compositions. Reference to the Loeb et al. Patent 3,170,867 will show that his work was done with cellulose acetates containing 54–56% by weight of the combined acetic acid. Translated to an acetyl basis, the cellulose acetates employed in the Loeb et al. membrane contained 38.8 to 40.2% acetyl based on the weight of the cellulose. The foregoing acetyl range is typical of the commercially available cellulose diacetate compositions. For example, the cellulose diacetate manufactured by Eastman Chemical Co., Rochester, N.Y., bearing the company designation #E-398-3 is sold as having an acetyl group concentration of 39.8%, but has actually been found to range between 39.2% and 40.8%.

It is a principal object of this invention to provide improvements in reverse osmosis technology employing cellulose acetate membranes including advancements in separation of solute from aqueous solutions without impairment of flux rate.

It is another object of the invention to provide an improved casting solution and method of manufacturing a cellulose acetate membrane.

It is a further object of the invention to provide an improved cellulose acetate membrane which is characterized by low salt permeation and relatively high rate of water transport thereacross.

It has now been discovered that there is a critical acetyl range for optimum flux and salt retention. The cellulose acetate reverse osmosis membrane of this invention is characterized by having an acetyl content in the range of about 41.5 to about 42.7% by weight of the cellulose acetate and preferably an acetyl range of 41.9% to 42.5% with the optimum being about 42.2%. Membranes prepared of cellulose acetate compositions within the foregoing range exhibit a remarkably less lower salt permeation than compositions outside of the range and still possess adequate flux. For example, a membrane of the invention having an acetyle content of 42.2% when tested against a saline water of 35,000 p.p.m. (typical of sea water) at a pressure of 1500 p.s.i.g. exhibit a flux of 11.7 gallons per square foot per day and a salt permeation of 164 p.p.m. A cellulose acetate membrane manufactured under like conditions and tested against a water of the same salinity and at the same pressure which membrane had an acetyl content of 41.5% possessed flux of 11.9 gallons per square foot per day and a salt permeation of 344 p.p.m. A still third membrane of the invention prepared under like conditions and tested under the same conditions as the foregoing membranes which third membrane had an acetyl content of 41.9% exhibited a flux of 11.1 and a salt permeation of 174 p.p.m. An acceptable potable water is generally considered to be a water having a salt concentration less than the range of 400–500 p.p.m. It was found that a fourth semipermeable membrane made under like conditions and tested under the same conditions as the preceding three membranes of the invention which fourth membrane had an acetyl content of 40.8% by actual analysis exhibited a flux of 9.2 and a salt permeation of 1220 p.p.m. which makes the membrane generally unacceptable for the treatment of sea water to recover a potable water in a one pass operation. The latter membrane having the acetyl content of 40.8 by actual lab analysis is a composition sold as a commercial diacetate material said to have an acetyl content of 39.8. It has been found by laboratory analysis that some slight variations do occur from the represented acetyl contents in commercially available cellulose acetates. A second commercially available acetate marketed as cellulose triacetate and said to have an acetyl content of 43.2 was found in one batch to have an actual acetyl content of 43.6% by laboratory analysis. When the latter commercial cellulose acetate was incorporated into a semipermeable membrane prepared in the same manner as the foregoing several membranes and tested under like conditions against a sea water salinity of 35,000 parts p.p.m. a performance was found of 4.5 flux and a salt permeation of 440 p.p.m. It is generally accepted that a commercial flux should be in excess of about 10 gallons per square foot per day. Hence, it is seen membranes having acetyl contents of 43.6% exhibit low flux rates, generally less than that commercially believed desirable.

The cellulose acetate membranes of the invention having an acetyl content of 41.5–42.7% by weight of the cellulose typically having fluxes within the range of 11 to 13 gallons per square foot per day and salt permeations of 106 to 350 p.p.m. The latter salt permeation range represents an exclusion by the membranes of approximately 99.0% to 99.7% of the original salt content of the water being processed. The preferred range of acetyl content of 41.9% to 42.5% gives decidedly superior membranes which typically have fluxes of 11.1 to 11.7 gallons per square foot per day and salt permeations within the range of 106 to 174 p.p.m. The latter salt permeation range represents salt exclusion of approximately 99.5% to 99.7% by the membrane of the original salt content of the water being processed. It will be appreciated that the foregoing data is comparative and that for a particular acetyl content the actual performance of a membrane may be varied considerably depending upon fabrication conditions including temperatures, a particular solvent employed in the casting solution, the swelling agent used and the solvating agent utilized.

The flow sheet of the drawing illustrates the combination of process steps used in forming the membrane.

Heretofore, it has been generally believed that salt retention characteristic of a cellulose acetate membrane was directly related to acetyl content, that is with an increase in the acetyl content of the membrane there should be a direct improvement in salt retention. It was also believed, heretofore, that the ability of a membrane to transport water thereacross was related to acetyl content, that is to say, it was believed that with an increased acetyl content of the cellulose membrane there was a proportionally less flux. It has now been found that the membrane of the invention containing the critical acetyl range unexpectedly possesses high flux ability and superior salt retention properties.

The critical acetyl range of the cellulose acetate used in the preparation of the membranes of the invention may be obtained by blending commercially available cellulose acetate compositions to obtain the desired acetyl content or alternatively the cellulose acetate composition may be initially prepared to provide the desired acetyl content without resort to the blending technique. It has been demonstrated that blending to produce membranes of the same acetyl content employing different starting materials result in membranes having essentially the same osmotic properties. It is frequently most convenient to prepare the membrane of the invention by blending commercially available basic types of cellulose acetate. For example, Eastman Chemical Products, Inc.. Kingsport, Tenn., markets a group of lacquer-type cellulose diacetates identified by the type numbers E–398, E–394, A–393 and E–383 which compositions contain respectively, acetyl contents by weight of the cellulose of 39.8%, 39.4%, 39.3% and 38.3%. Eastman markets a composition described as cellulose triacetate under the company designation type A–432 which acetate has an acetyl composition by weight of 43.2%. The so-called triacetate composition is not fully acetyl substituted as a theoretical fully substituted cellulose triacetate would have an acetyl content of 44.4% by weight. In the data reported in this patent application, laboratory analyses have been run to determine the correct acetyl content of the various materials employed. The applicant is unaware of any commercially available cellulose acetate compositions having acetyl contents adequate for the manufacture of the membrane of the invention.

The solubility of cellulose acetate in organic solvents changes progressively with changes in chemical composition. Cellulose acetates having acetyl contents in the range of 38–40% are readily soluble in typical medium polarity solvents such as acetone, methyl ethyl ketone, methyl acetate, ethyl lactate, and 1,4-dioxane. Cellulose acetate compositions having high acetyl contents such as the commercially available Eastman cellulose triacetate are soluble in a few specific solvents such as tetrachloroethane, methylene chloride and methylene chloride/methanol solutions. The triacetate material is also soluble in acetone—1,4-dioxane mixtures and in one preferred method of fabrication, the cellulose triacetate is first dissolved in an acetone-dioxane solution through an overnight agitation. Following which the desired amount of cellulose diacetate is added and the agitation continued until the diacetate goes into solution. In this preferred formulation, methanol is used as the solvating agent and maleic acid as a swelling agent. It will be understood that in formulating the casting solution that various solvents, solvating and swelling agents are available.

The casting solution of the invention may be hand cast or machine cast as known in the art. For example, the casting may be accomplished by feeding the casting solution which may be at room temperature through a hollow doctor blade with the blade resting on raised brackets at the edges of a casting surface, e.g. a glass plate maintained at around −10° C. Typically, the blade is pulled across the plate at a rate such that the film which is formed has a thickness between 10 and 20 mils. A typical casting rate is around 0.5–10 inches of film per second. Following casting, the film is allowed to dry briefly, for example, around three minutes to permit partial evaporation of the solvent. The length of the drying period will vary considerably with the formulation employed. During the casting operation, the doctor blade and casting surface, which may be a glass plate, are maintained generally at a low temperature, for example, around −10° C. in the instance of an acetone-dioxane solution. It is known that certain plastic casting surfaces in contrast to a glass plate may be maintained at higher temperatures, e.g. around room temperature.

Following casting of the film and partial evaporation of the solvent, the casting glass plate and film thereon are dipped into cold water which may range in temperature from 0° to about 10° C. For an acetone-dioxane solution, the temperature is preferably maintained at about 0 to +3° C. The casting plate is thrust into the cold water bath in one continuous motion with the plate making an angle of about 30° to about 60° with the surface of the water. The film will soon float off the glass casting plate, at which time it will be strong enough to manipulate. The film is rolled up in a damp state. If the film is permitted to dry, it will lose its desirable properties and is unsuitable for desalination. It will be understood that the conditions employed in the manufacture of the swollen film will vary considerably depending upon the technique used and the composition of the casting solution and whether the film is being produced on a continuous or batch basis.

The desired quantity of solvent for dissolution of the cellulose acetate in the preparation of the casting solution is that required to provide a workable casting solution. Typically, in the instance of a solution employing approximately equal amounts of acetone and dioxane, there may be 40 to 80 parts of solvent per ten parts of the cellulose acetate. The casting solution will typically contain about 0 to 2 parts of the solvating agent whether it be water or alcohol for each 10 parts of the cellulose acetate.

EXAMPLE I

In this example the several membranes fabricated had average acetyl contents of 42.2% by weight and were prepared by blending equal quantities (7.7 grams) of an Eastman cellulose triacetate (A–432–130B) and Eastman cellulose acetate (E–398–3). The casting solutions contained 37.8 grams of acetone, 46.8 grams of 1,4-dioxane, along with 7 grams of methanol and 3 grams of maleic acid. Water may be used in place of the methanol and other swelling agents than maleic acid may be employed. Fabrication of the membranes included casting at −10° C., immersion in a 0° water bath and annealing for 3–5 minutes in a water bath maintained at a temperature of 89° C. The membranes were cast both by hand in the general fashion described above and by a machine casting apparatus. The membranes were then tested in a standard reverse osmosis test apparatus operated at 1500 p.s.i.g. using a 3.5% sodium chloride water solution (35,000 p.p.m.). The results of these tests are set forth in Table I below.

TABLE I.—CELLULOSE DIACETATE-TRIACETATE BLEND

| Preparation Type | Number of Tests | Flux, g.f.d. | Salt Permeation NaCl, p.p.m. |
|---|---|---|---|
| Hand cast | 18 | 11.7±0.7 | 164±35 |
| Machine cast | 12 | 11.1±0.9 | 202±58 |

EXAMPLE II

The work of this example was undertaken to demonstrate the osmotic properties of different blends of cellulose triacetate (Eastman A–432–130B) and cellulose diacetate (Eastman E–398–3). The several membranes were prepared in accordance with the procedure outlined in Example I and the osmotic properties of the blends were obtained through operation of a standard test reverse osmosis cell on 3.5% sodium chloride feed solutions (35,000 p.p.m.) at 1500 p.s.i.g. Results of the tests appear in Table II below. The first column gives the relative proportions of the cellulose diacetate and cellulose triacetate used in each of the blends and the resulting acetyl content.

TABLE II

| Blends Parts CDA/ Parts CTA | Percent Acetyl Content | Number of Tests | Flux, g.f.d. | Salt Permeation |
|---|---|---|---|---|
| 75/25 | 41.5 | 10 | 11.9 | 344 |
| 60/40 | 41.9 | 8 | 11.1 | 174 |
| 50/50 | 42.2 | 18 | 11.7 | 164 |
| 40/60 | 42.5 | 8 | 9.1 | 143 |
| 25/75 | 42.9 | 6 | 6.8 | 450 |

EXAMPLE III

The work of this example demonstrates the reliability with which the osmotic properties of the membrane may be correlated to acetyl content. A formulation was prepared containing a 50/50 blend of a cellulose triacetate and a cellulose diacetate. The cellulose triacetate possessed an acetyl content of 43.6% by weight of the cellulose. The diacetate composition was thought to have an acetyl content of 40.8% by weight. Such a blend calculates to have an acetyl content of 42.2% and from previous experience the osmotic properties of a membrane of this acetyl content should be a flux of 11.7 and a salt permeation of 164 p.p.m. The formulation was prepared in an acetone-dioxane mixture of the type disclosed in Example I. The swelling agents were methanol and maleic acid and the fabrication generally followed the procedure set forth in Example I. The osmotic properties of the resulting membrane were found to be a flux of 10.7 gallons per square foot per day and a salt permeation of 335. This performance did not coincide with previous experience which indicated that for such osmotic properties the acetyl value of the membrane should be 41.5% instead of the calculated acetyl value of 42.2%. The acetyl value of the triacetate component of the blend was definitely established to be 43.6%. Calculations based on the previous experience indicated that the true acetyl content of the cellulose diacetate component of the blend was probably 40.0% instead of the believed 40.8%. Based on the indicated value of 40.0% the casting solution was re-formulated with a 60/40 mixture of the triacetate and diacetate compositions, respectively. The resulting membrane prepared from the 60/40 mixture, when tested gave precisely the predicted osmotic properties of 11.7 flux and a salt permeation of 164 p.p.m. At this time the cellulose diacetate composition was resubmitted for analysis and was found indeed to have the acetyl value of 40.0% by weight.

It will be understood that various modifications may be made in this invention without departing from the spirit thereof or the scope of the appended claims.

I claim:

1. A cellulose acetate polymer reverse osmosis membrane having a relatively thin active layer made up of a compacted mass of polymer molecules and a second relatively thick layer having an open cell structure formed of the same cellulose acetate polymer, said membrane being further characterized by being formed of a cellulose acetate polymer having an acetyl content in the range of about 41.5% to about 42.7% by weight of the cellulose acetate with said active layer having the relative ability to pass water and restrain the passage of salt.

2. A cellulose acetate reverse osmosis membrane in accordance with claim 1 wherein the acetyl content is within the range of about 41.9% to about 42.5%.

3. A cellulose acetate reverse osmosis membrane in accordance with claim 1 wherein the acetyl content is about 42.2%.

4. In a method for preparing reverse osmosis membrane suitable for separation of water from aqueous solution, the improvement comprising:
  dissolving a film forming cellulose ester, water, and a swelling agent in an organic solvent, said film forming cellulose ester characterized by having an acetyl content in the range of about 41.5% to about 42.7% by weight of the cellulose acetate;
  casting the foregoing cellulose acetate solution in a thin film on a casting surface;
  permitting the solvent to at least partially evaporate from the film;
  wetting the film by immersion in cold water to obtain a film having a swollen gel structure; and
  annealing the swollen film to provide a tight membrane having the ability to pass water and restrain passage of salt.

5. A method in accordance with claim 4 wherein the acetyl content of the cellulose ester is in the range of about 41.9% to about 42.5%.

6. A method in accordance with claim 4 wherein the acetyl content of the cellulose acetate is about 42.5%.

7. A reverse osmosis method of separating water from an aqueous solution employing a semipermeable cellulose acetate membrane, said method comprising:
  providing an aqueous solution to an active side of the semipermeable cellulose acetate membrane, said membrane characterized in having an acetyl content in the range of about 41.5% to about 42.7% by weight of the cellulose acetate;
  applying pressure to the aqueous solution in excess of the osmotic pressure of said solution; and
  recovering water of reduced solute content from the other side of said membrane.

8. A method in accordance with claim 7 wherein the acetyl content of the cellulose acetate is in the range of about 41.9% to about 42.5%.

9. A method in accordance with claim 7 wherein the acetyl content of the cellulose acetate is about 42.5%.

References Cited

UNITED STATES PATENTS

| | | | |
|---|---|---|---|
| 3,129,159 | 4/1964 | Maier et al. | 106—196 |
| 3,291,625 | 12/1966 | Faraone et al. | 106—196 |

OTHER REFERENCES

Ott et al., "High Polymers," vol. V, part III, 1955, p. 1454.

Monjikian et al., "Improvement In Fabrication Techniques for Reverse Osmosis Desalinization Membranes," October 1965, pp. 2–5.

PHILIP E. ANDERSON, Primary Examiner

U.S. Cl. X.R.
106—196; 161—159; 264—49, 217